United States Patent
Murai

(10) Patent No.: US 9,749,005 B2
(45) Date of Patent: Aug. 29, 2017

(54) WIRELESS TRANSMISSION DEVICE, WIRELESS RECEPTION DEVICE, WIRELESS COMMUNICATION SYSTEM, AND WIRELESS COMMUNICATION METHOD

(71) Applicant: NEC Corporation, Minato-ku, Tokyo (JP)

(72) Inventor: Takayuki Murai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 2 days.

(21) Appl. No.: 15/115,061

(22) PCT Filed: Feb. 16, 2015

(86) PCT No.: PCT/JP2015/000700
§ 371 (c)(1),
(2) Date: Jul. 28, 2016

(87) PCT Pub. No.: WO2015/129195
PCT Pub. Date: Sep. 3, 2015

(65) Prior Publication Data
US 2016/0344442 A1    Nov. 24, 2016

(30) Foreign Application Priority Data
Feb. 28, 2014 (JP) .................... 2014-038949

(51) Int. Cl.
*H04B 1/7073* (2011.01)
(52) U.S. Cl.
CPC .................... *H04B 1/7073* (2013.01)
(58) Field of Classification Search
CPC ......... H04B 1/703; H04B 1/708; H04B 1/709
See application file for complete search history.

(56) References Cited

U.S. PATENT DOCUMENTS

| | | | | |
|---|---|---|---|---|
| 4,977,578 A | * | 12/1990 | Ishigaki | H04B 1/707 375/140 |
| 5,400,359 A | * | 3/1995 | Hikoso | H04B 1/707 375/133 |

(Continued)

FOREIGN PATENT DOCUMENTS

| | | |
|---|---|---|
| JP | 2001-086086 A | 3/2001 |
| JP | 2002-064409 A | 2/2002 |

(Continued)

OTHER PUBLICATIONS

International Search Report for PCT Application No. PCT/JP2015/000700, mailed on Mar. 24, 2015.

(Continued)

*Primary Examiner* — Syed Haider

(57) ABSTRACT

Stable clock synchronization is ensured even under a multi fading environment such as the non-line-of-sight communication.
On a transmission side, multiplying a clock signal by a spreading code, a spread-spectrum clock signal is generated whose spectrum being made to spread; frequency conversion is performed on a signal obtained by superimposing an information signal on the spread-spectrum clock signal and a radio signal is transmitted by wireless. On the other hand, on a receiving side, the radio signal is received, frequency conversion is performed on the radio signal, and a frequency-converted radio signal is divided into two lines. A clock signal extracted by performing spectrum despreading on one of divided radio signals by multiplying a spreading code; and clock synchronization is performed on other one of the divided radio signals using the clock signal having been extracted.

14 Claims, 12 Drawing Sheets

(56) References Cited

U.S. PATENT DOCUMENTS

| | | | | |
|---|---|---|---|---|
| 5,856,997 A * | 1/1999 | Mochizuki | ............ | H04B 1/707 375/150 |
| 6,546,041 B1 * | 4/2003 | Fujimoto | ............ | H04B 1/7097 375/130 |
| 6,868,108 B1 * | 3/2005 | Clark | ............ | H04J 13/10 370/203 |
| 8,611,310 B2 * | 12/2013 | Black | ............ | H03K 3/84 370/335 |
| 2008/0043819 A1 * | 2/2008 | Li | ............ | H04B 1/707 375/142 |
| 2013/0182747 A1 | 7/2013 | Nakamura et al. | | |

FOREIGN PATENT DOCUMENTS

| | | |
|---|---|---|
| JP | 2005-277642 A | 10/2005 |
| JP | 2007-267132 A | 10/2007 |
| JP | 2009-033702 A | 2/2009 |
| JP | 2013-145999 A | 7/2013 |
| WO | 2011/089667 A1 | 7/2011 |

OTHER PUBLICATIONS

English translation of Written opinion for PCT Application No. PCT/JP2015/000700, Mar. 24, 2015.

* cited by examiner

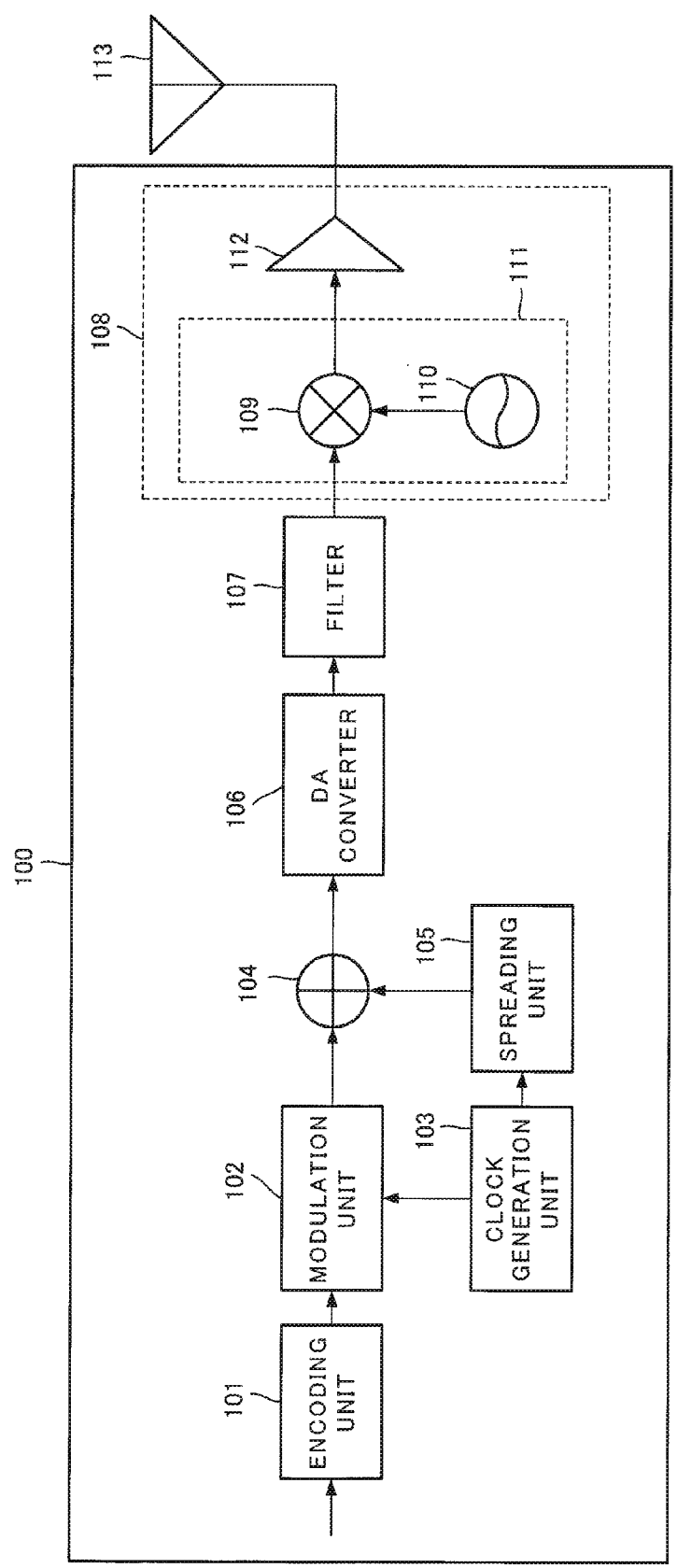

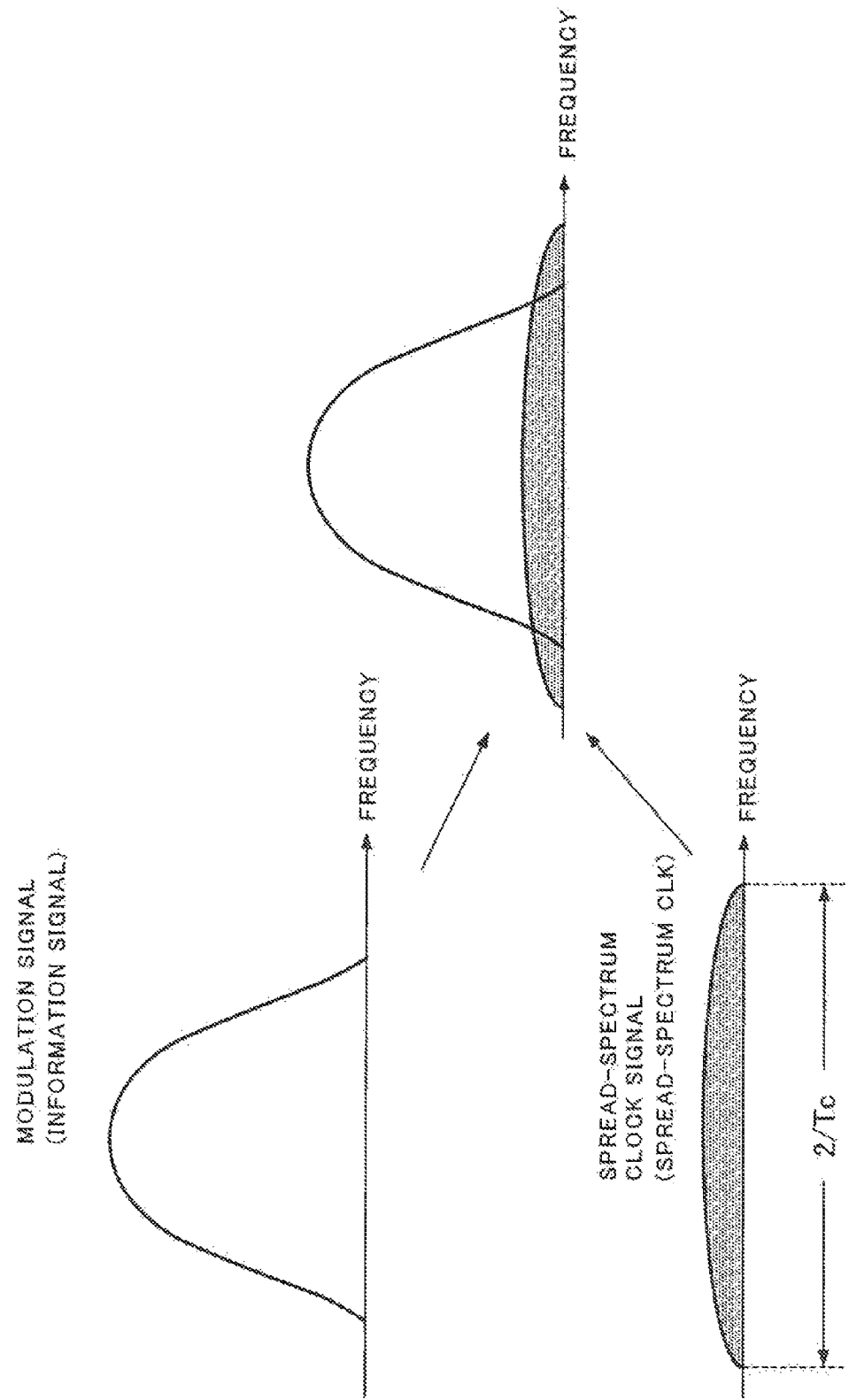

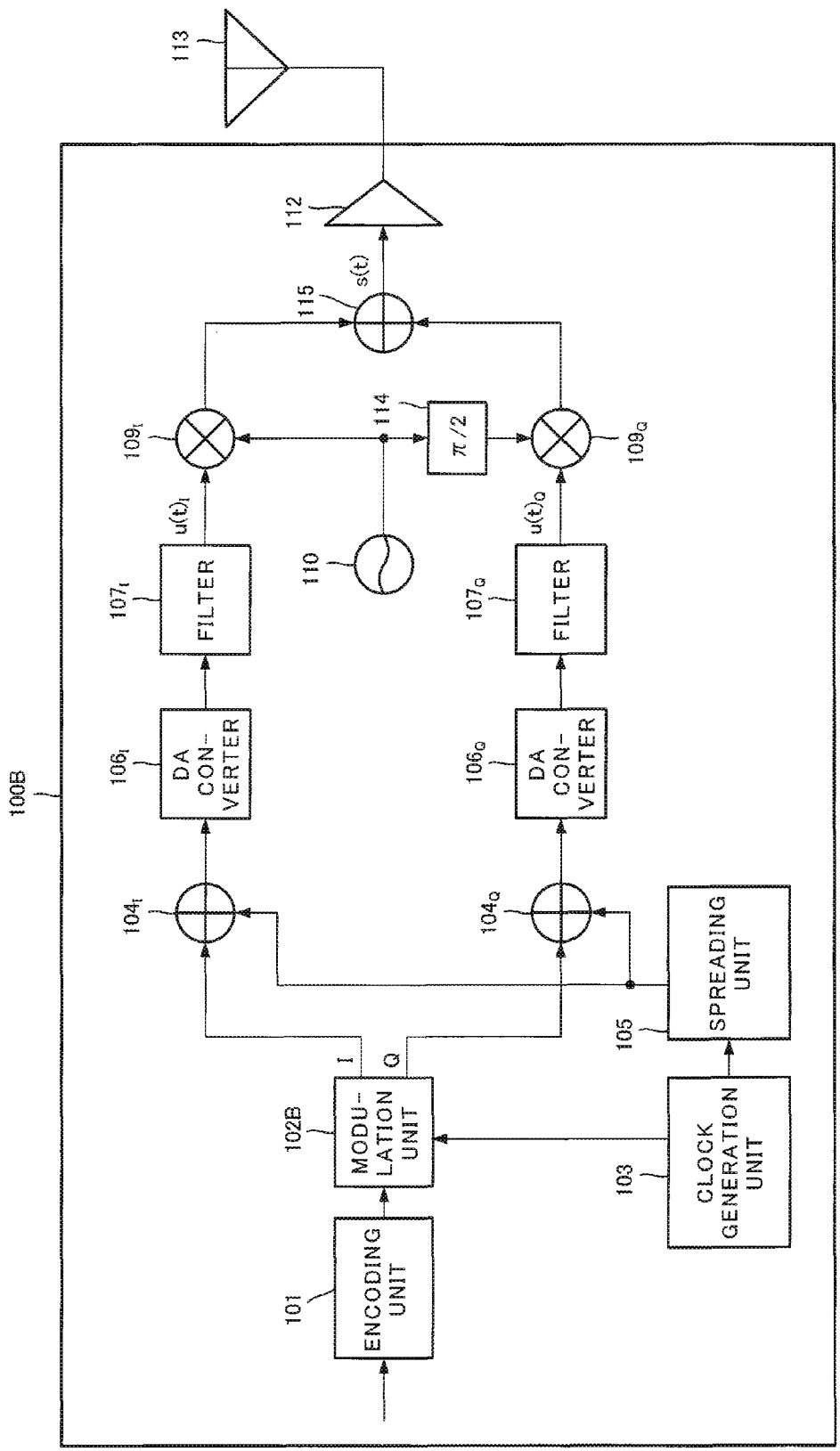

ents of all of which are incorporated herein be reference, in their entirety.
WIRELESS TRANSMISSION DEVICE, WIRELESS RECEPTION DEVICE, WIRELESS COMMUNICATION SYSTEM, AND WIRELESS COMMUNICATION METHOD This application is a National Stage Entry of PCT/JP2015/000700 filed on Feb. 16, 2015, which claims priority from Japanese Patent Application 2014-038949 filed on Feb. 28, 2014, the contents of all of which are incorporated herein be reference, in their entirety.

TECHNICAL FIELD

The present invention relates to a wireless transmission device, a wireless receiving device, a wireless communication system, and a wireless communication method.

BACKGROUND ART

In wireless communications, the reception level (electric field intensity) fluctuates because incoming waves interfere mutually which have passed through a plurality of different paths (multipath) due to reflection, refraction, scattering, and the like caused by structures, natural terrains, and the like (multipath fading). In the line-of-sight communication, since the intensity of incoming waves is relatively low that arrive through paths other than those for direct waves, and that are included in radio waves arriving at the receiving side, there is less fluctuation of transmission characteristics due to a positional relation and the like.

On the other hand, in the non-line-of-sight (NLOS) communication, in which there are obstacles between the transmitting and receiving sides, since no direct waves arrive at the receiving side and there is no difference in the intensities of incoming waves through respective paths, the transmission characteristics fluctuate a lot due to the mutual interference between the incoming waves through the respective paths. For example, the transmission characteristics fluctuate a lot with only a slight variation of the positional relation between the receiving side and the transmitting side which is caused by the movement of the receiving side. Accordingly, in the non-line-of-sight communication, a variety of design systems, considering a fading margin, for example, are adopted as measures against the multipath fading.

In addition, it is known that wireless-transmitting information signals to be transmitted encoded with high error-correcting capability makes it possible to operate even with a small carrier to noise (C/N) ratio. For example, it is known that when an error-correcting code such as the BCH (Bose-Chaudhuri-Hocquenghem) code is applied in the AWGN (Additive White Gaussian Noise) channel, the bit error rate (BER) characteristics concerning the C/N value are improved by an order of magnitude or more compared to a case without the error correction although the information bit rate decreases. That is to say, encoding with the high error-correcting capability decreases the BER, which enables low C/N operations. Low density parity check (LDPC) codes and the like can also be used as the error-correcting code.

In non-line-of-sight communication, down fading is likely to occur at low C/N operation. Down fading is a state in which the receiving electric field intensity keeps falling below a threshold value for a predetermined time or more due to a level fluctuation. In this case, it is likely to get out of clock synchronization because a receiving baseband unit cannot regenerate a clock signal. A baseband unit in a wireless receiving device synchronizes a device clock with a received signal (a baseband signal), and performs demodulation processing and decoding processing (error-correcting decoding). Consequently, the baseband unit is prevented from carrying out decoding processing because the occurrence of down fading makes it impossible to perform clock regeneration.

On the other hand, it is possible to avoid the influence of the multipath fading in the non-line-of-sight communication by spreading and transmitting an information signal using the DS-SS (direct sequence spread spectrum) system and performing the spectrum-despreading on the receiving side. For example, the DS-SS system is employed as a secondary modulation in the IEEE (Institute of Electrical and Electronics Engineers) 802.11b, which is the standard for the wireless LAN (local area network) in which the non-line-of-sight communication is performed in the 2.4 GHz band.

In the DS-SS system, the transmitting side performs a secondary modulation with a spreading code on a first-modulated signal (narrow-band modulation wave) for information transmission, and then transmits the signal. For example, in IEEE 802.11b, a first modulation using the phase difference of the carrier wave is performed, that is, the first modulation called DBPSK (Differential Binary Phase Shift Keying) is performed on 1 Mbps signals, DQPSK (Differential Quaternary Phase Shift Keying) on 2 Mbps signals, and CCK (Complementary Code Keying) on 5.5/11 Mbps signals. Then the secondary modulation using the DS-SS system is performed on the signals, which are spread over a 20 MHz bandwidth, for example.

If S(t) represents a narrow-band modulation wave, $Sp_N(t)$ represents a spreading code composed of 1 and −1, and $S_{SS}(t)$ represents a signal having been spectrum-spread, $S_{SS}(t)$ is given by the following formula.

$$S_{SS}(t)=S(t)\times S_{PN}(t) \quad \text{(Formula 1)}$$

If the bandwidth of S(t) is represented by B and the bandwidth of $S_{PN}$ is represented by $B_{PN}$, a spreading code is used by which $B_{PN} \gg B$ is satisfied. $B_{PN}/B$ is called a spreading ratio. On the receiving side, a received signal $S_{SS}(t)$ spectrum-spread on the transmitting side is multiplied by the same spreading code $S_{PN}(t)$ as that of the transmitting side in the same phase. This enables the original signal S(t) to be restored (spectrum despreading) as shown in formula 2 because $S_{PN}(t) \times S_{PN}(t)=1$.

$$\begin{aligned}S_{SS}(t)\times S_{PN}(t) &= \{S(t)\times S_{PN}(t)\}\times S_{PN}(t) \\ &= S(t)\times \{S_{PN}(t)\times S_{PN}(t)\} \\ &= S(t)\end{aligned} \quad \text{(Formula 2)}$$

It is known that the DS-SS system grows in the interference resistance capability by using a code with strong autocorrelation characteristics as a spreading code. It is necessary, however, to secure a wide occupied bandwidth for data signals if the large-capacity communication is required for the DS-SS wireless communication. In wireless communications in which frequency bands are allocated, it is impractical to achieve a still wider bandwidth corresponding to the large-capacity communication.

Patent Literature 1 discloses a method for improving the detection accuracy of a synchronizing timing by detecting a correlation peak using a correlation threshold value that is set depending on received signals when a S/N (Signal to Noise) ratio of the received signals is low. In the technique disclosed in Patent Literature 1, a default correlation threshold value is generated by multiplying the average value of correlation detection values between spectrum-spread received signals and spreading codes by a parameter varying with a state of synchronization/asynchronization. A final correlation threshold value is generated by comparing the correlation detected value with a default correlation threshold value during a peak detection period, and the generated final correlation threshold value is set in a correlation peak detection unit. The technique disclosed in Patent Literature 1, however, cannot produce a full effect in communications under the multipath fading.

Patent Literature 2 and Patent Literature 3 disclose a technique to shorten a signal acquisition time, and a technique to disperse a harmonic of a clock signal and control a harmonic remaining in a used frequency band, respectively. In addition, Patent Literature 4 discloses a timing reproduction device which extracts a baseband signal from a received signal having been despread and generates a reference clock for a latch timing of the baseband signal based on a power value into which the extracted baseband signal is converted.

CITATION LIST

Patent Literature

[PTL 1] Japanese Unexamined Patent Application Publication No. 2007-267132
[PTL 2] Japanese Unexamined Patent Application Publication No. 2005-277642
[PTL 3] Japanese Unexamined Patent Application Publication No. 2013-145999
[PTL 4] Japanese Unexamined Patent Application Publication No. 2009-33702

SUMMARY OF INVENTION

Technical Problem

As disclosed in Patent Literature 1 to Patent Literature 4, it is generally expected for the communication to become possible even under low C/N conditions by using an error-correcting code. In the non-line-of-sight communication and the like, however, the reception level fluctuates largely due to multipath fading or the like, and the down fading arises in low C/N communication. In this case, the clock synchronization is gotten out because the clock signal cannot be regenerated, and therefore it is impossible to take advantage of the error-correcting code.

The present invention has been made in light of the above-described problems. The object of the present invention is to provide a wireless transmission device, a wireless receiving device, a wireless communication system, and a wireless communication method that are capable of ensuring stable clock synchronization even under a multi fading environment such as the non-line-of-sight communication.

Solution to Problem

To achieve the above-mentioned object, a wireless transmission device according to an exemplary aspect of the present invention includes clock generation means for generating a clock signal; spreading means for multiplying the clock signal by a spreading code and generating a spread-spectrum clock signal whose spectrum being made to spread; an adder configured to superimpose an information signal on the spread-spectrum clock signal; and transmitting means for performing frequency conversion on an output signal from the adder and transmitting a radio signal by wireless.

To achieve the above-mentioned object, a wireless receiving device according to an exemplary aspect of the present invention includes receiving means for receiving a radio signal including a signal obtained by superimposing an information signal on a spread-spectrum clock signal, performing frequency conversion on the radio signal, and outputting frequency-converted signal as a received signal; a distributor configured to divide the received signal having been output into two lines; despreading means for performing spectrum despreading on one of divided received signals by multiplying a spreading code and extracting a clock signal; and clock synchronization means for performing clock synchronization on other one of the divided received signals using the clock signal having been extracted.

To achieve the above-mentioned object, a wireless communication system according to an exemplary aspect of the present invention includes the above-mentioned wireless transmission device configured to transmit a radio signal by wireless; and the above-mentioned wireless receiving device configured to receive the radio signal.

To achieve the above-mentioned object, a wireless communication method according to an exemplary aspect of the present invention includes, on a transmission side, multiplying a clock signal by a spreading code and generating a spread-spectrum clock signal whose spectrum being made to spread; performing frequency conversion on a signal obtained by superimposing an information signal on the spread-spectrum clock signal and transmitting a radio signal by wireless; and, on a receiving side, receiving the radio signal, performing frequency conversion on the radio signal, and dividing a frequency-converted radio signal into two lines; extracting a clock signal by performing spectrum despreading on one of divided radio signals by multiplying a spreading code; and performing clock synchronization on other one of the divided radio signals using the clock signal having been extracted.

Advantageous Effects of Invention

According to the above-described aspects of the present invention, it is possible to ensure stable clock synchronization even under a multi fading environment such as the non-line-of-sight communication.

BRIEF DESCRIPTION OF DRAWINGS

FIG. 1A is a block diagram illustrating a configuration of a wireless transmission device 100 in accordance with an exemplary embodiment of the present invention.

FIG. 4 is a diagram schematically illustrating superposition of signal waveforms in an adder of a wireless transmission device in accordance with an exemplary embodiment of the present invention.

FIG. 5 is a block diagram illustrating a configuration of another wireless transmission device 100B in accordance with an exemplary embodiment of the present invention.

DESCRIPTION OF EMBODIMENTS (A First Exemplary Embodiment)

Figure 10A:
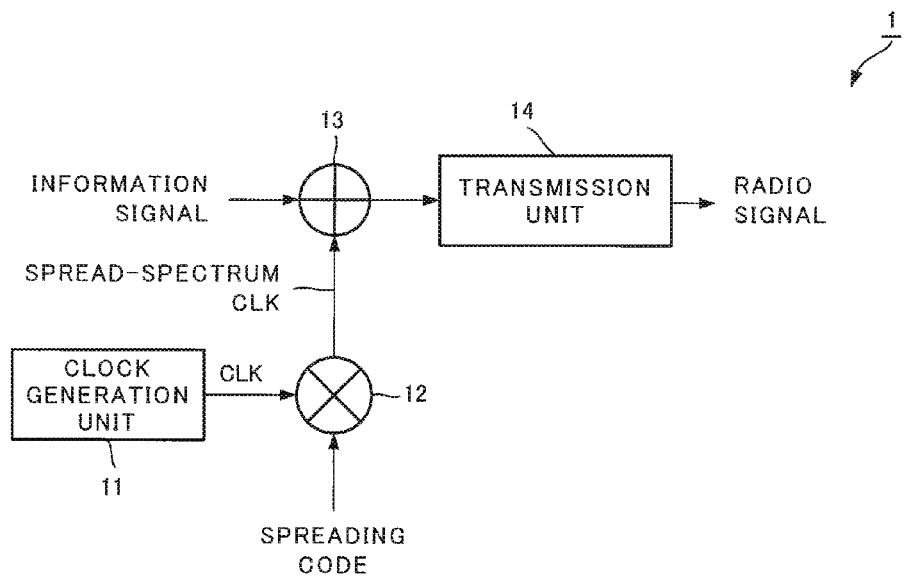
FIG. 10A is a block diagram illustrating a configuration of a wireless transmission device 1 in accordance with the present invention.

A first exemplary embodiment of the present invention will be described. FIG. 10A illustrates a block diagram of a wireless transmission device, and FIG. 10B illustrates a block diagram of a wireless receiving device, in accordance with the present exemplary embodiment.

In FIG. 10A, a wireless transmission device 1 includes a clock generation unit 11, a spreading unit 12, an adder 13, and a transmission unit 14.

The clock generation unit 11 generates a clock signal (CLK). The spreading unit 12 multiplies the clock signal by a spreading code and generates a spread-spectrum clock signal (spread-spectrum CLK) whose spectrum is made to spread. The adder 13 superimposes an information signal to be transmitted on the spread-spectrum clock signal. The transmission unit 14 performs frequency conversion (up-conversion) on the output from the adder 13 and transmits an up-converted signal by wireless.

Figure 10B:
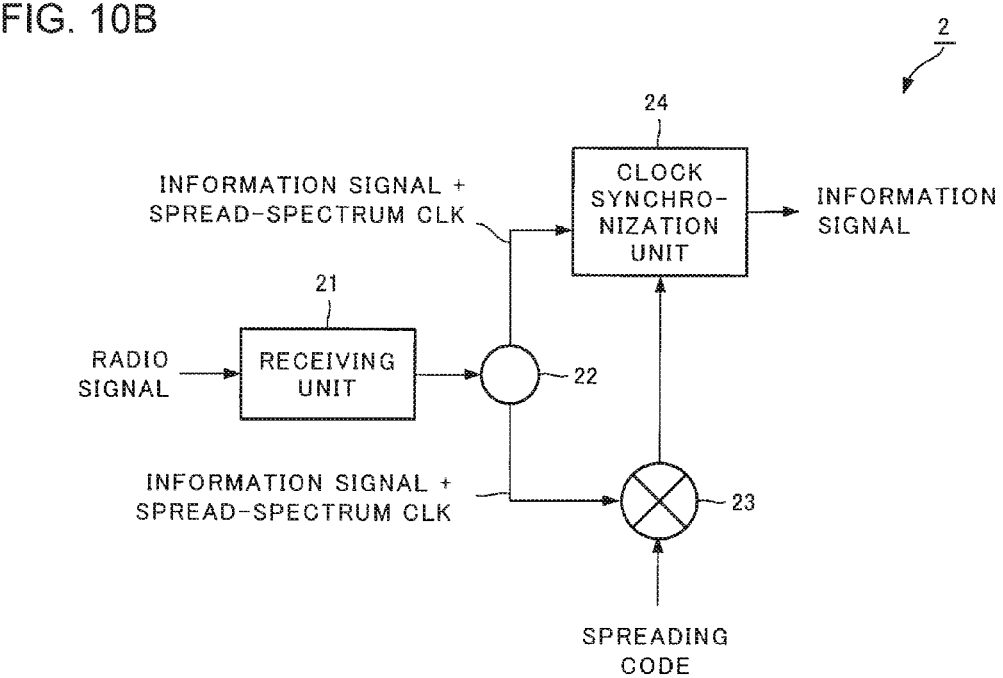
FIG. 10B is a block diagram illustrating a configuration of a wireless receiving device 2 in accordance with the present invention.

In FIG. 10B, a wireless receiving device 2 includes a receiving unit 21, a distributor 22, a despreading unit 23, and a clock synchronization unit 24.

The receiving unit 21 receives a radio signal that has been transmitted by wireless from the wireless transmission device 1 and includes the information signal and the spread-spectrum clock signal. The receiving unit 21 performs frequency conversion (down-conversion) on the received radio signal and outputs a down-converted signal to the distributor 22. The distributor 22 divides the inputted radio signal, outputs one signal (information signal+spread-spectrum clock signal) to the despreading unit 23, and the other signal (information signal+spread-spectrum clock signal) to the clock synchronization unit 24.

The despreading unit 23 performs the spectrum despreading on the inputted one signal by multiplying the same spreading code as that of the transmission side in the same phase, and extracts the clock signal (CLK) from signals. The despreading unit 23 outputs the extracted clock signal to the clock synchronization unit 24. The extracted clock signal in the despreading unit 23 may be multiplied, and a chip rate timing may be generated.

The clock synchronization unit 24 performs a clock synchronous processing on the other signal inputted from the receiving unit 21 using the clock signal inputted from the despreading unit 23.

As described above, in the present exemplary embodiment, the wireless transmission device 1 spectrum-spreads a clock signal by the spreading unit 12 and transmits by wireless a radio signal including an information signal and a spread-spectrum clock signal. Then the despreading unit 23 in the wireless receiving device 2 spectrum-despreads the radio signal including the information signal and the spread-spectrum clock signal and extracts the clock signal.

In this case, the clock signal is made to spectrum-spread, its frequency band is broadened, and its power spectrum density decreases. That is to say, spectrum-spreading a clock signal using DS-SS system improves the interference resistance to the clock signal. Accordingly, in the present exemplary embodiment, it is possible to ensure stable clock synchronization even under an environment such as non-line-of-sight communication in which the multipath fading and the like becomes a problem.

(A Second Exemplary Embodiment)

A second exemplary embodiment will be described. First, a wireless transmission device will be described. FIG. 1A illustrates a block diagram of a wireless transmission device in accordance with the present exemplary embodiment. In FIG. 1A, a wireless transmission device 100 includes an encoding unit 101, a modulation unit 102, a clock generation unit 103, an adder 104, a spreading unit 105, a DA (digital to analog) converter 106, a filter 107, a transmission unit 108, and a transmitting antenna 113.

The encoding unit 101 encodes an inputted data signal using an error-correcting code, for example, and supplies the encoded signal to the modulation unit 102.

The clock generation unit 103 generates a clock signal and supplies the generated clock signal to the modulation unit 102 and the spreading unit 105. The clock generation unit 103 in accordance with the present exemplary embodiment includes a phase locked loop (PLL), for example, and outputs the clock signal and a timing signal for a chip rate in the spreading unit 105 (a signal obtained by multiplying a clock signal by a spreading factor). The clock generation unit 103 can include a function of generating an internal clock signal of the wireless transmission device 100 and supply the clock signal (bit rate) to the encoding unit 101.

The modulation unit 102 modulates the signal inputted from the encoding unit 101 using the clock signal inputted from the clock generation unit 103, and supplies the modulated signal to the adder 104. The amount of transmitted bit per symbol period is two bits in the QPSK (Quadrature Phase Shift Keying) modulation, and the modulation unit 102 outputs a Gray-coded or differentially-encoded baseband signal or the like. Here, the modulation unit 102 in accordance with the present exemplary embodiment uses the clock signal inputted from the clock generation unit 103 as a timing clock signal for defining a symbol rate, for example.

Figure 1B:
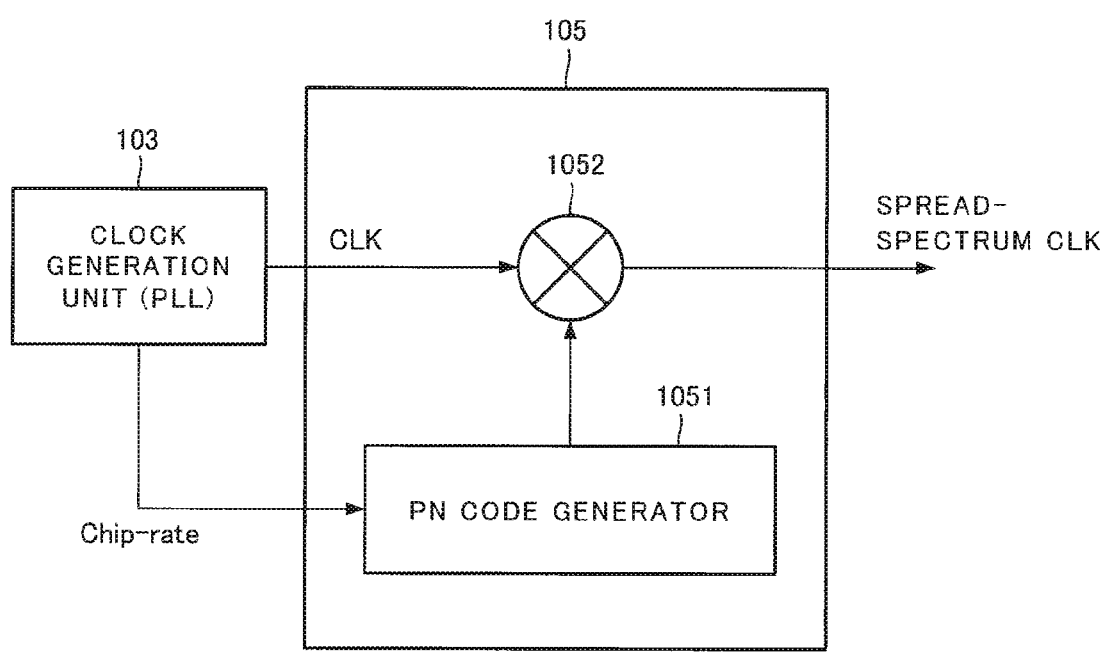
FIG. 1B is a block diagram illustrating a configuration of a spreading unit 105 in accordance with an exemplary embodiment of the present invention.

The spreading unit 105 generates a spread-spectrum clock signal whose spectrum is spread by multiplying the inputted clock signal by a spreading code (DS-SS system), and outputs the generated spread-spectrum clock signal to the adder 104. A block diagram illustrating a configuration of the spreading unit 105 is shown in FIG. 1B. The clock generation unit 103 is shown in FIG. 1B together with the spreading unit 105.

In FIG. 1B, the spreading unit 105 includes a PN (pseudo noise) code generator 1051 and a multiplier 1052. The PN code generator 1051 generates a spreading code (PN code) from a timing signal for a chip rate inputted from the clock generation unit 103, and outputs the spreading code to the multiplier 1052. The multiplier 1052 multiplies an inputted clock signal (CLK) by the inputted spreading code and generates a spread-spectrum clock signal (spread-spectrum CLK) whose spectrum is spread.

In the present exemplary embodiment, the timing signal for the chip rate is inputted into the spreading unit 105 from the clock generation unit 103, and the PN code generator 1051 and the multiplier 1052 operate at the chip rate. The spreading unit 105 will be described later.

The adder 104 superimposes the modulation signal inputted from the modulation unit 102 on the spread-spectrum clock signal inputted from the spreading unit 105, and outputs a digital baseband signal to the DA converter 106. The adder 104 will be described later.

The DA converter 106 converts the inputted digital baseband signal into an analog signal at a chip rate, for example. The analog signal converted in the DA converter 106 is inputted into the transmission unit 108 through the filter 107 that has predetermined frequency characteristics, such as an LPF (low pass filter).

The transmission unit 108 includes a mixer 109, a local oscillator 110, and a power amplifier 112. Here, the mixer 109 and the local oscillator 110 composes a frequency converter 111 that frequency-converts the frequency of the inputted analog signal into an intended radio frequency (RF). The transmission unit 108 multiplies, in the mixer 109, the analog signal inputted from the filter 107 by a local oscillation signal generated by the local oscillator 110 (analog multiplication). Further, the transmission unit 108 power-amplifies, in the power amplifier 112, the output signal from the mixer 109, and transmits the amplified signal from the antenna 113 by wireless.

Next, the functions of the spreading unit 105 and the adder 104 will be described in detail using FIG. 3A, FIG. 3B, FIG. 3C, and FIG. 4.

Figure 3A:
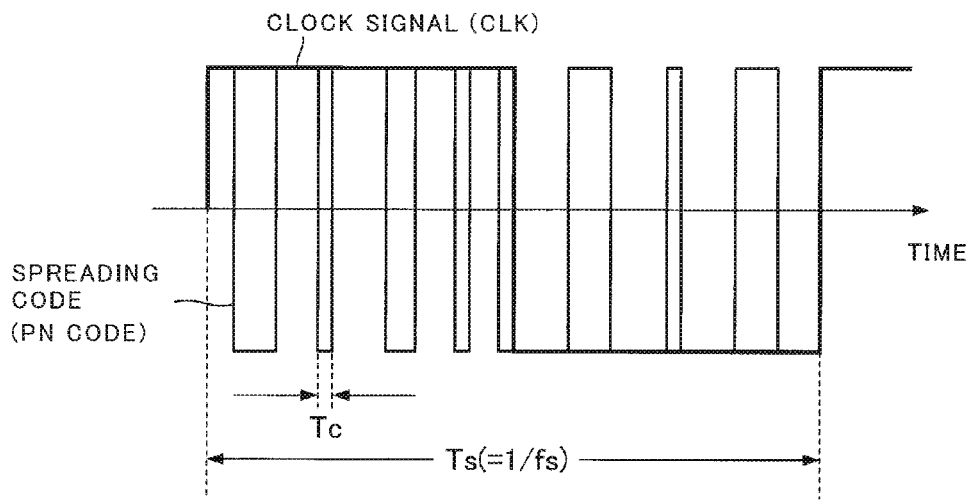
FIG. 3A is a waveform chart to explain a spread spectrum of a clock signal in accordance with an exemplary embodiment of the present invention.

As illustrated in FIG. 3A, the clock signal (CLK) in accordance with the present exemplary embodiment is a signal whose duty for a single clock cycle (Ts=1/fs) is equal to 50%. The spreading code (PN code) with the chip rate (=1/Tc) takes a value of 1 and −1.

The multiplier 1052 in the spreading unit 105 multiplies the clock signal by the spreading code at the chip rate. If "High" of the clock signal corresponds to 1 and "Low" corresponds to −1, the signal resulting from the multiplication corresponds with the spreading code during a time period when the clock signal is "High" and is reversed in polarity to the spreading code during a time period when the clock signal is "Low".

Figure 3B:
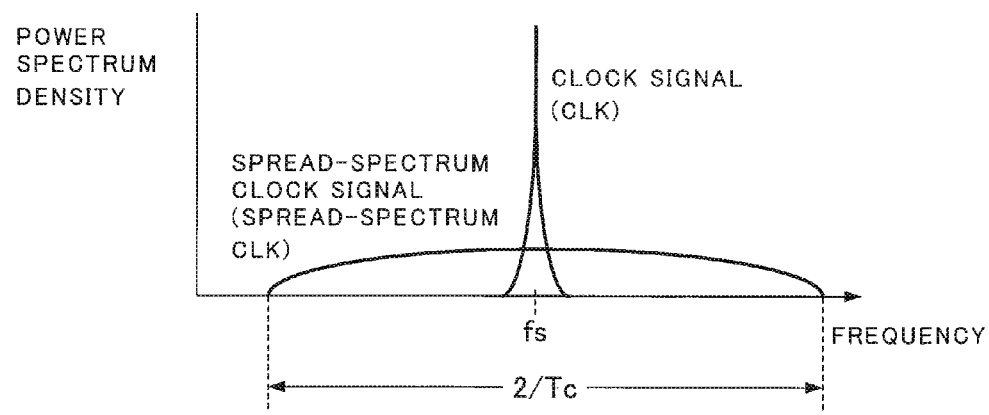
FIG. 3B is a diagram exemplifying frequency spectra of an original clock signal and a spread-spectrum clock signal in accordance with an exemplary embodiment of the present invention.

FIG. 3B illustrates a frequency spectrum of the clock signal output from the clock generation unit 103 and a frequency spectrum of the spread-spectrum clock signal output from the spreading unit 105. As illustrated in FIG. 3B, the bandwidth of the spread-spectrum clock signal becomes equal to 2/Tc (Tc: a chip rate). In FIG. 3B, only a fundamental frequency fs is illustrated in the frequency spectrum of the clock signal, and odd-order harmonics are omitted such as third-order (3 fs), fifth-order (5 fs), and seventh-order (7 fs), which arise at a duty of 50%.

Figure 3C:
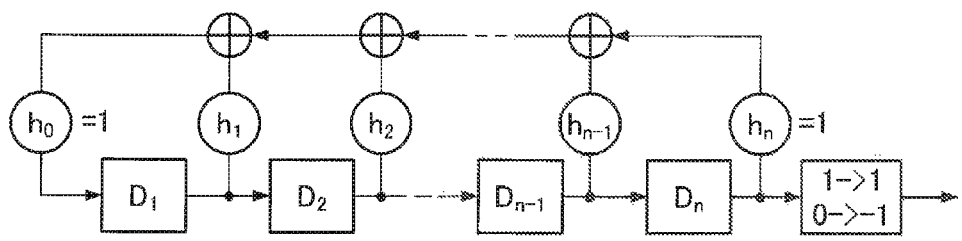
FIG. 3C is a block diagram illustrating a configuration of a Maximum-length sequence generation circuit in accordance with an exemplary embodiment of the present invention.

FIG. 3C illustrates a block configuration diagram of the PN code generator 1051 that is configured by a Maximum-length sequence generation circuit (shift register circuit). The generating polynomial of the Maximum-length sequence generation circuit is given by formula 3.

(Formula 3)

$$h(x)=x^n+h_{n-1}x^{n-1}+ \ldots +h_1x+1 \qquad \text{Formula (3)}$$

where $h_n=1$ and $h_0=1$. The PN code generator 1051 outputs 1 when the output of D-type flip-flop $D_n$ is equal to 1 and outputs −1 when the output of D-type flip-flop $D_n$ is equal to 0.

The adder 104 receives input of the modulation signal inputted from the modulation unit 102 and the spread-spectrum clock signal (bandwidth: 2/Tc) having been described referring to FIG. 3B. The modulation signal and the spread-spectrum clock signal that are inputted into the adder 104 are illustrated on the left side of FIG. 4. The adder 104 adds the inputted modulation signal to the spread-spectrum clock signal in a frequency domain, and outputs the frequency spectrum illustrated on the right side of FIG. 4.

Figure 2:
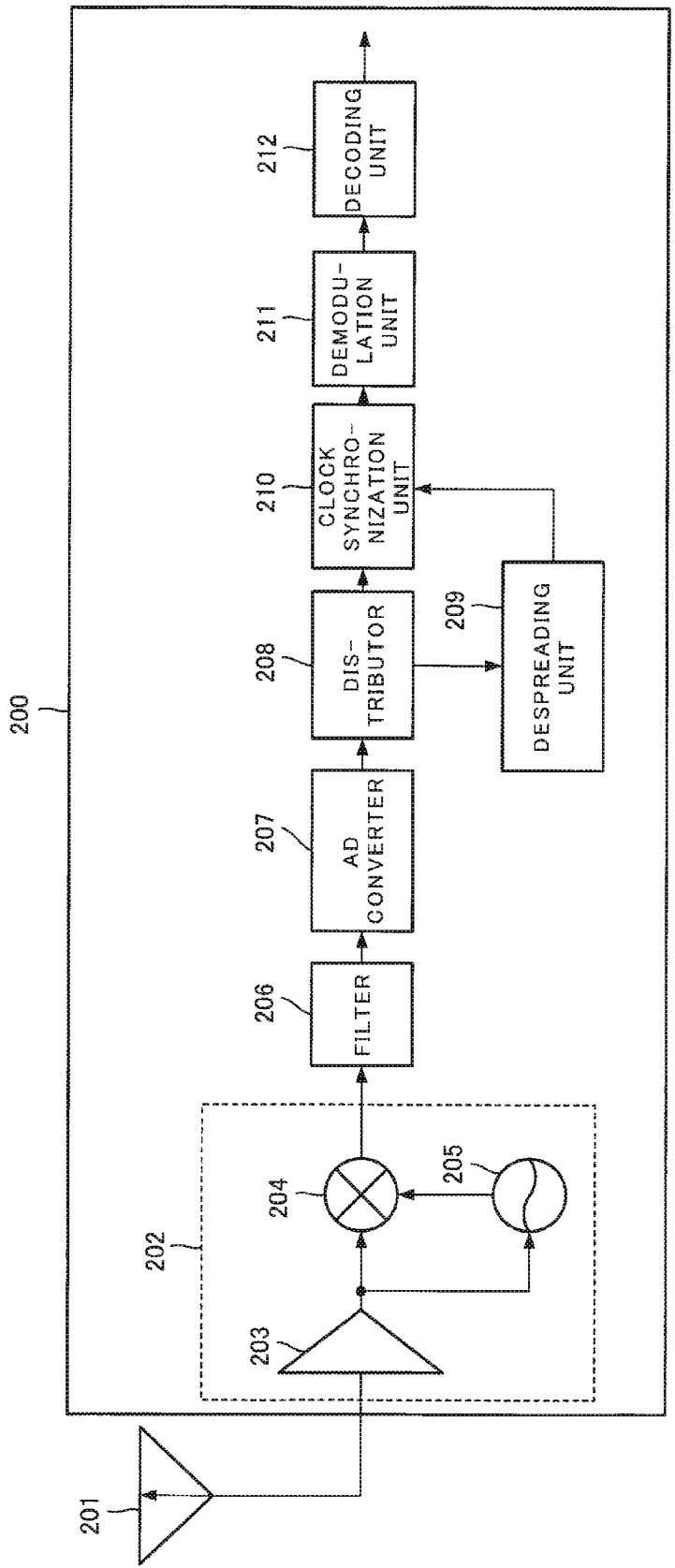
FIG. 2 is a block diagram illustrating a configuration of a wireless receiving device 200 in accordance with an exemplary embodiment of the present invention.

Next, a wireless receiving device in accordance with the present exemplary embodiment will be described. FIG. 2 illustrates a block configuration diagram of a wireless transmission device in accordance with the present exemplary embodiment. In FIG. 2, a wireless receiving device 200 includes a receiving antenna 201, a receiving unit 202, a filter 206, an AD (analog to digital) converter 207, a distributor 208, a despreading unit 209, a clock synchronization unit 210, a demodulation unit 211, and a decoding unit 212.

The receiving antenna 201 receives a radio transmission signal transmitted by wireless from the transmitting antenna 113 in the wireless transmission device 100, and outputs the radio transmission signal to the receiving unit 202.

The receiving unit 202 is composed of a low-noise amplifier 203, a carrier regeneration circuit 205, and a mixer 204. The low-noise amplifier 203 amplifies the inputted radio transmission signal, and outputs the amplified signal to the carrier regeneration circuit 205 and the mixer 204. The carrier regeneration circuit 205 regenerates a carrier signal from the inputted signal, and outputs the regenerated carrier signal to the mixer 204. The mixer 204 analog-multiplies the signal inputted from the low-noise amplifier 203 by the carrier signal regenerated in the carrier regeneration circuit 205, and outputs a signal obtained by frequency-converting (down-conversion) the inputted signal into an intermediate frequency (IF).

The signal output from the receiving unit 202 is inputted into the AD converter 207 through the filter 206 having prescribed frequency characteristics such as an LPF, and is converted into a digital baseband signal. The digital baseband signal output from the AD converter 207 is divided by the distributor 208 into two tributaries, one of which is output to the despreading unit 209, the other of which is output to the clock synchronization unit 210.

Figure 7:
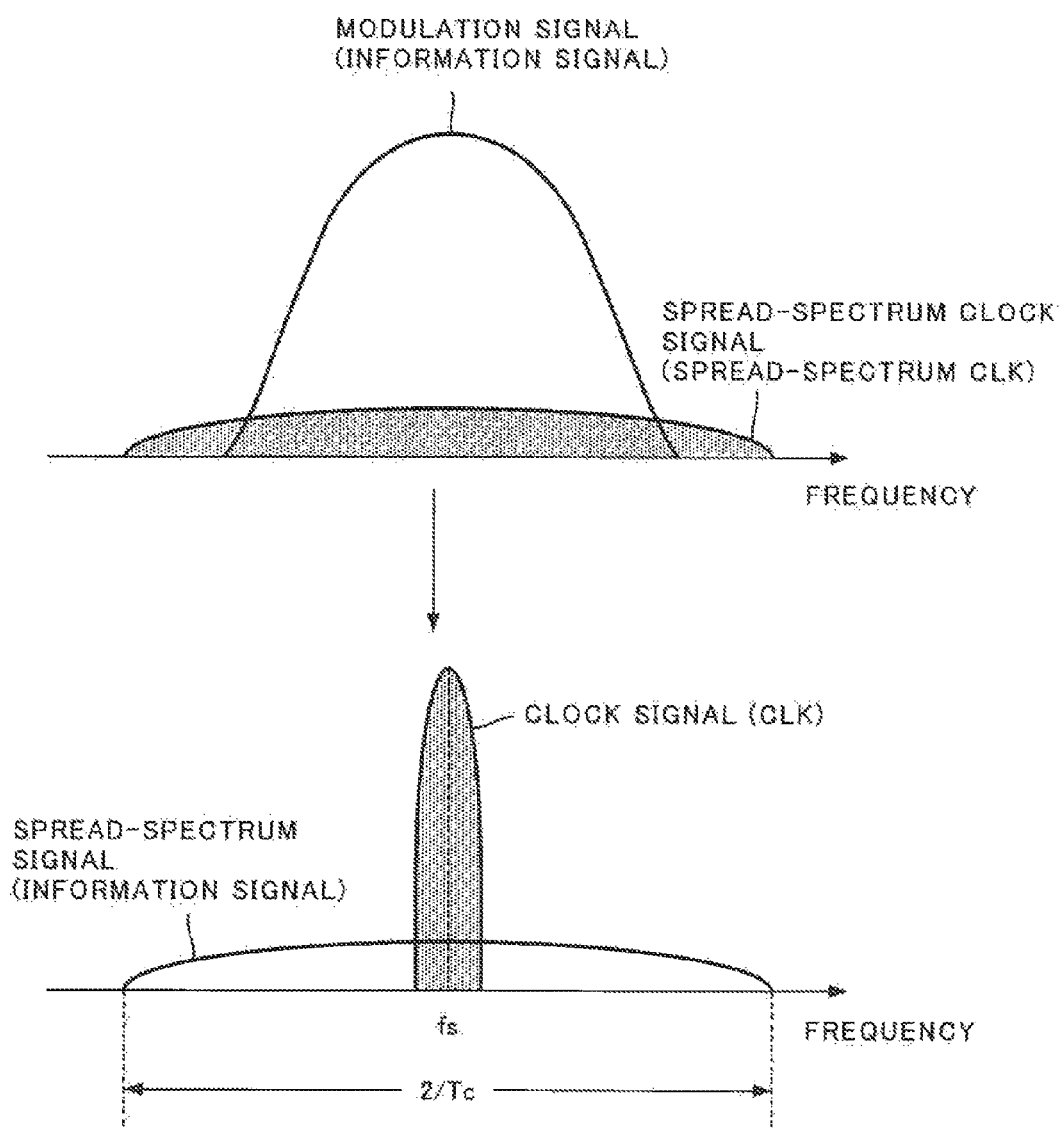
FIG. 7 is a diagram schematically illustrating an input signal waveform (frequency spectrum) and an output signal waveform (frequency spectrum) of a despreading unit 209 in accordance with an exemplary embodiment of the present invention.

The despreading unit 209 detects a phase of the spreading code and spectrum-despreads the inputted digital baseband signal. As illustrated in FIG. 7, the digital baseband signal (modulation signal+spread-spectrum clock signal) is spectrum-despread, by which the spread-spectrum clock signal is restored to the original clock signal (frequency fs). On the other hand, the spectrum of the modulation signal is spread due to the spectrum despreading (bandwidth: 2/Tc, 1/Tc represents a chip rate), and by that amount, its power spectrum density decreases. The despreading unit 209 outputs the spectrum-despread clock signal and the spread-spectrum signal (information signal) to the clock synchronization unit 210. The spectrum-despread information signal has no impact on the clock signal in the subsequent processing of the receiving system.

Figure 6A:
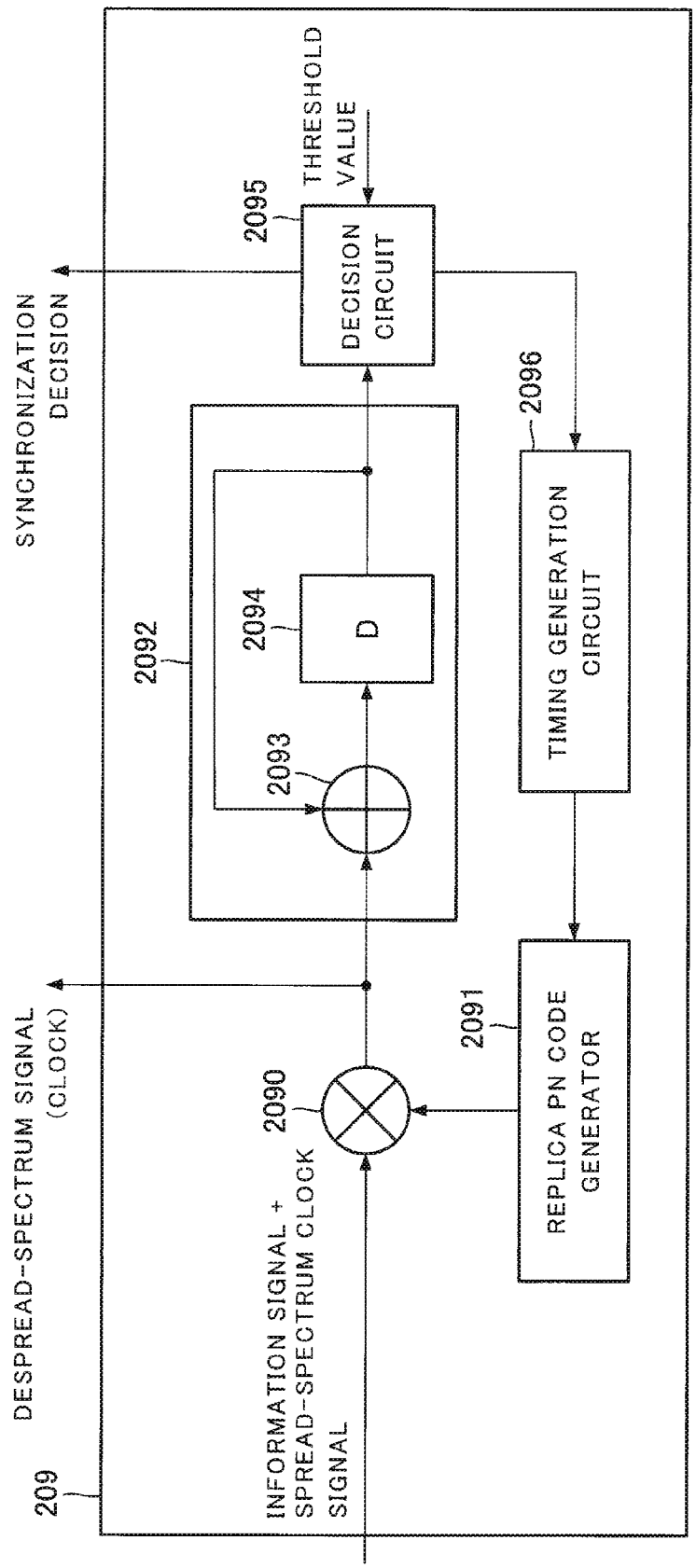
FIG. 6A is a block diagram illustrating a configuration of a despreading unit 209 in accordance with an exemplary embodiment of the present invention.

Here, the synchronization detection of the spreading code can be achieved by a sliding correlator. FIG. 6A illustrates a block configuration diagram of the despreading unit 209 in this case. The despreading unit 209 in FIG. 6A is composed of a multiplier 2090, a replica PN code generator 2091, an accumulator 2092, a decision circuit 2095, and a timing generation circuit 2096.

The multiplier 2090 multiplies the inputted digital baseband signal (information signal+spread-spectrum clock signal) by the spreading code (a PN code identical with the PN code on the transmission side) inputted from the replica PN code generator 2091, and outputs the resultant signal to the accumulator 2092.

The accumulator 2092 computes a correlation value between the inputted digital baseband signal and the spreading code by integrating the inputted digital baseband signal over the length of the spreading code (=L chip), and outputs the correlation value to the decision circuit 2095. The accumulator 2092 in accordance with the present exemplary embodiment is composed of an adder 2093 and a memory circuit (D type register) 2094 holding the last signal.

The decision circuit 2095 compares the inputted correlation value between the digital baseband signal and the spreading code with a prescribed threshold value, and decides whether or not the synchronization detection is present. The decision circuit 2095 decides that the phase of the spreading code synchronizes if the correlation value is equal to or greater than the threshold value. On the other hand, if the correlation value is less than the threshold value, the decision circuit 2095 controls a timing phase using the timing generation circuit 2096 by shifting, by one chip, for example, the phase of the spreading code from the replica PN code generator 2091.

Figure 6B:
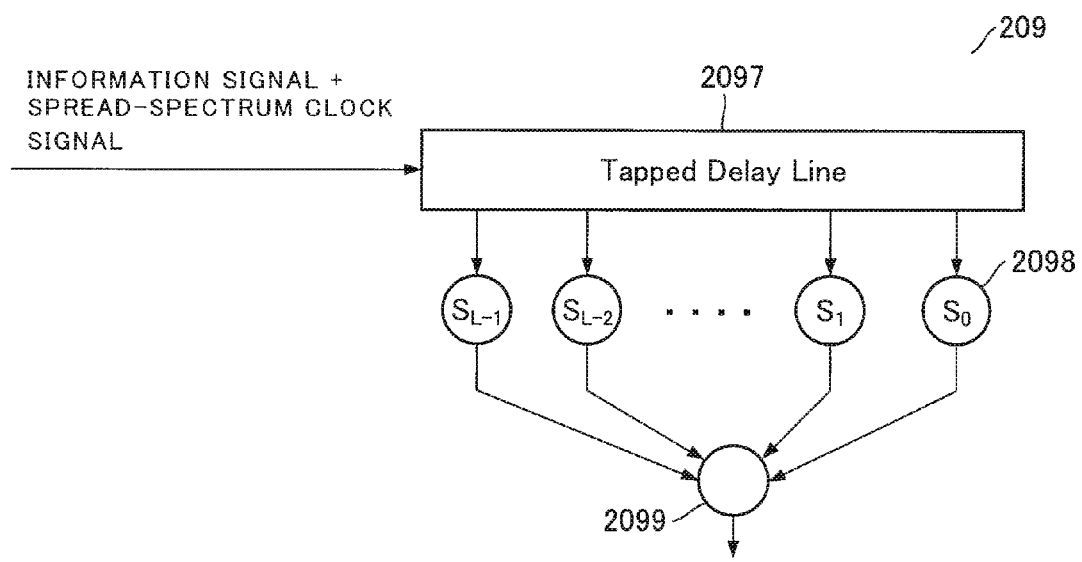
FIG. 6B is a block diagram illustrating a configuration of another despreading unit 209 in accordance with an exemplary embodiment of the present invention.

In addition, the synchronization detection of the spreading code can also be achieved by means other than the sliding correlator. FIG. 6B illustrates a block configuration diagram of the despreading unit 209 in this case. The despreading unit 209 illustrated in FIG. 6B adds a delay depending on a chip rate to the inputted digital baseband signal (information signal+spread-spectrum clock signal) in a tapped delay line 2097, and sequentially outputs resultant signals to L multipliers 2098. This enables the spreading code (PN code) to be restored from the spread-spectrum clock signal. The L multipliers 2098 multiply a tap output by the spreading code (PN code) $S_{L-1}$ to $S_0$ inputted from the tapped delay line 2097, respectively, and an adder 2099 sums up results of the multiplication.

This enables a correlation value between the digital baseband signal and the spreading code to be output per clock, and the synchronization to be detected within clock cycles corresponding to the number of taps (L) of the tapped delay line 2097 at a maximum.

Returning back to the description of FIG. 2, the clock synchronization unit 210 synchronizes the information signal with the clock signal inputted from the despreading unit 209 with respect to the digital baseband signal inputted from the distributor 208. The information signal synchronized with the clock is demodulated in the demodulation unit 211 and decoded with error-correction in the decoding unit 212.

Then the information signal decoded with error-correction is output to an information processing unit or the like that is not illustrated.

According to the present exemplary embodiment, a clock signal is spectrum-spread using DS-SS system and then added to a data signal on the transmission side, and the clock signal is extracted by spectrum-despreading on the receiving side. This makes it possible to ensure stable clock synchronization even under an environment where the multipath fading has a major effect, such as the non-line-of-sight communication. Ensuring stable clock synchronization makes it possible to correct code errors in the data signal due to the influence of the multipath fading using an error-correcting code, which enables the device to operate with low C/N as a whole.

(A Modification of the Second Exemplary Embodiment)

A modification of the second exemplary embodiment will be described. FIG. 5 illustrates a block configuration diagram of a wireless transmission device 100B in accordance with the present exemplary embodiment. In a wireless quadrature modulator 100B illustrated in FIG. 5, a modulation unit 102B outputs a modulation signal of in-phase channel I of the real number component of a complex envelope and a modulation signal of quadrature channel Q of the imaginary component. The in-phase channel I and the quadrature channel Q of the modulation signal are output to adders $104_I$ and $104_Q$, respectively.

The adders $104_I$ and $104_Q$ add a spread-spectrum clock signal inputted from a spreading unit 105 to the inputted in-phase channel I and the quadrature channel Q, respectively, and output the resultant signals to DA converters $106_I$ and $106_Q$. The signals inputted into the DA converters $106_I$ and $106_Q$ are converted into analog signals in the DA converters $106_I$ and $106_Q$, and output to mixers $109_I$ and $109_Q$ through filters $107_I$ and $107_Q$ that are LPFs having root-Nyquist characteristics.

The mixer $109_I$ analog-multiplies inputted signal $u(t)_I$ by a local oscillation signal generated by a local oscillator 110. On the other hand, the mixer $109_Q$ analog-multiplies the inputted signal $u(t)_Q$ by a local oscillation signal that is generated by the local oscillator 110 and π/2-phase-shifted by a phase shifter 114.

An adder 115 analog-adds two RF signals output from the mixers $109_I$ and $109_Q$, and outputs an output signal s(t) to a power amplifier 112. The output signal s(t) is power-amplified in the power amplifier 112, and then transmitted by wireless from a transmitting antenna 113.

The output signal s(t) output from the adder 115 corresponds to a real part of a value obtained by complex-multiplying a complex modulation signal z(t) (=$u(t)_I$+j$u(t)_Q$, $j^2$=−1), where the above-mentioned I and Q components are set for real part $u(t)_I$ and imaginary part $u(t)_Q$ respectively, by the local oscillation signal (exp (j2π$f_c$t), $f_c$: an oscillation frequency of the local oscillator 110) output from the local oscillator 110. If the mixer 109 illustrated in FIG. 1 is configured by a complex multiplication circuit and the local oscillation signal (frequency $f_c$) generated by the local oscillator 110 is expressed in exp (j2π$f_c$t), FIG. 1 corresponds to FIG. 5.

(A Third Exemplary Embodiment)

Figure 8:
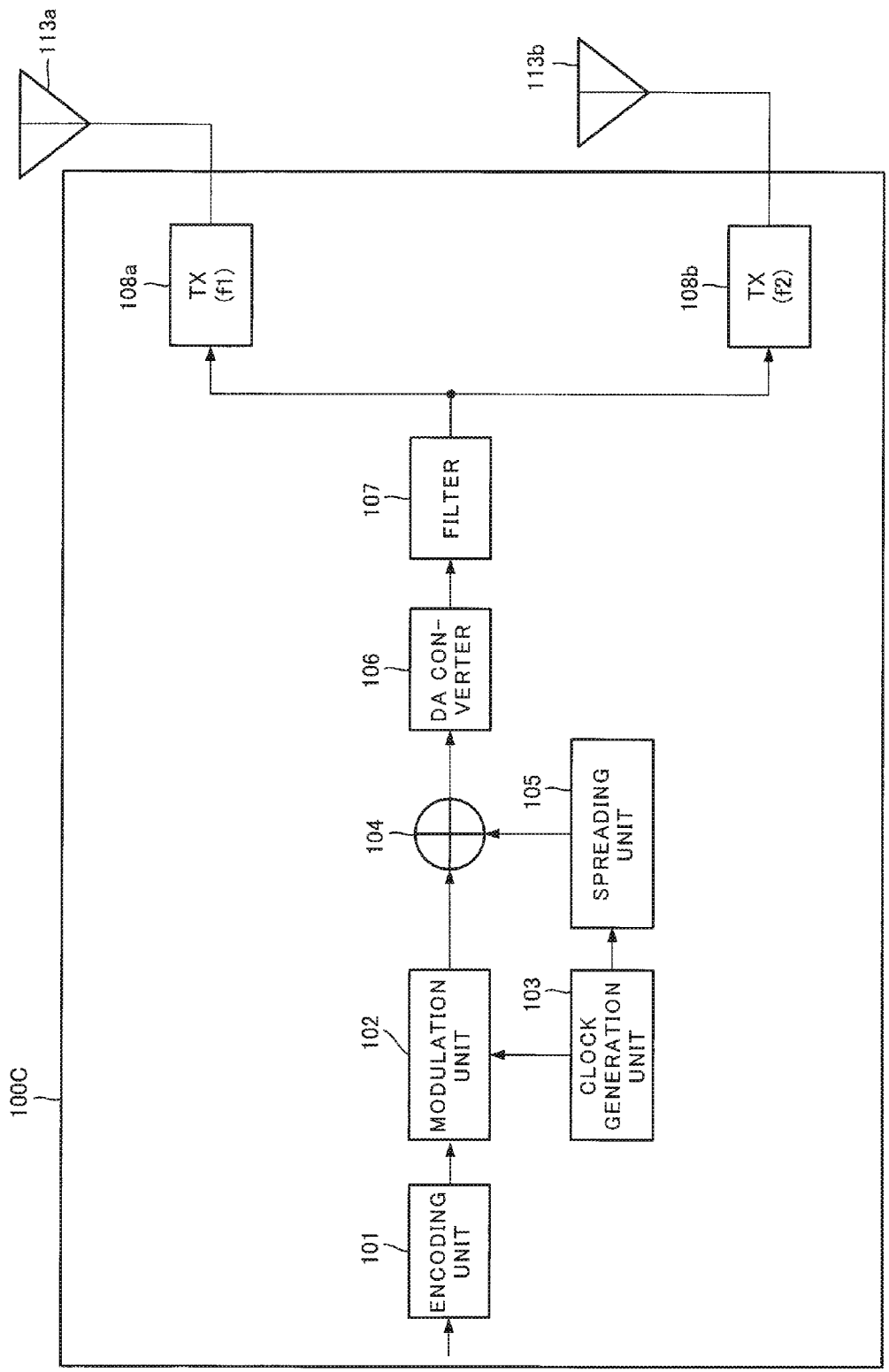
FIG. 8 is a block diagram illustrating a configuration of a wireless transmission device 100C in accordance with another exemplary embodiment of the present invention.
Figure 9:
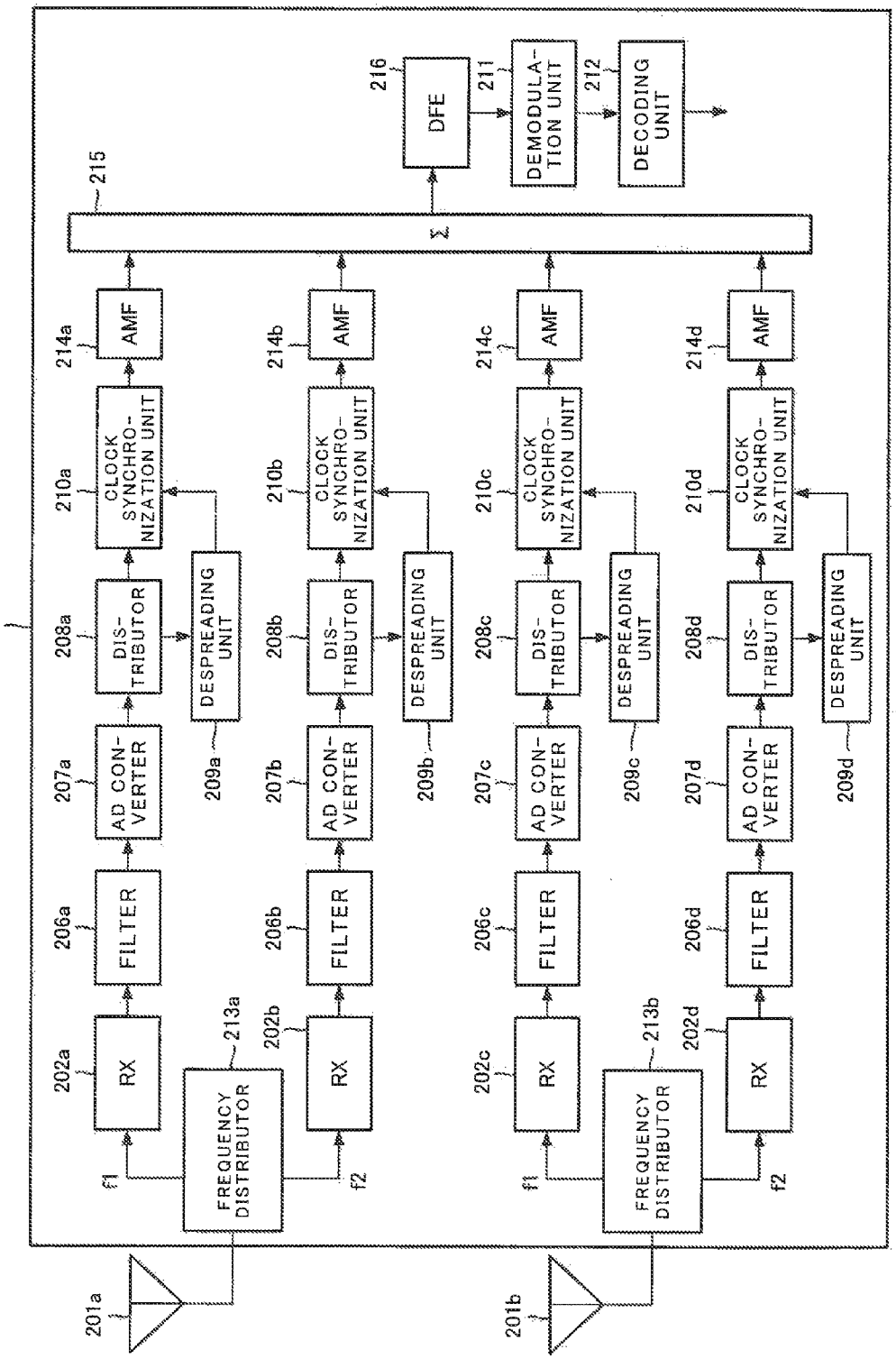
FIG. 9 is a block diagram illustrating a configuration of a wireless receiving device 200B in accordance with another exemplary embodiment of the present invention.

A third exemplary embodiment will be described. FIG. 8 and FIG. 9 illustrate block configuration diagrams of a wireless transmission device 100C and a wireless receiving device 200B, respectively, which are applied to the non-line-of-sight communication by fourfold diversity using two antennas (space diversity) and two frequencies (frequency diversity).

The branch number L of the space diversity is not limited to two, and the branch number L of the frequency diversity is not limited to two. However, since L-fold bandwidth is required for the branch number L of the frequency diversity, the frequency efficiency is down, and L-fold transmission power is required.

In FIG. 8, only a single line is illustrated with respect to an adder 104, a DA converter 106, and a filter 107. In FIG. 9, although each of receiving units 202a to 202d performs wireless quadrature demodulation and outputs intermediate frequency (IF) signals having each of I and Q components, a single line is illustrated for each complex signal composed of I and Q components with respect to a filter 206, an AD converter 207, a distributor 208, a despreading unit 209, a clock synchronization unit 210, and an adaptive matched filter (AMF) 214.

In FIG. 8, an encoding unit 101 performs LDPC encoding which is a linear block code defined by a sparse parity-check matrix H and uses iterative decoding called sum-product decoding.

The signal inputted from a modulation unit 102 and the spread-spectrum clock signal inputted from a spreading unit 105 are added in the adder 104, and inputted into transmission units 108a and 108b through the DA (digital to analog) converter 106 and the filter 107.

The transmission units (TX) 108a and 108b convert the inputted signals into a signal having frequency f1 and a signal having frequency f2, respectively, power-amplify and transmit by wireless the resultant signals from transmitting antennas 113a and 113b. Each of the two-wave signals transmitted by wireless from the transmitting antennas 113a and 113b propagates through a different propagation channel, and is received by receiving antennas 201a and 201b of the wireless receiving device 200B which are located so as to become spatially uncorrelated.

In FIG. 9, the signal received by the receiving antenna 201a is divided by a frequency distributor 213a into frequency f1 and frequency f2, the signal having frequency f1 is inputted into the receiving unit (RX) 202a, and the signal having frequency f2 is inputted into the receiving unit (RX) 202b. On the other hand, the signal received by the receiving antenna 201b is divided by a frequency distributor 213b into frequency f1 and frequency f2, the signal having frequency f1 is inputted into the receiving unit (RX) 202c, and the signal having frequency f2 is inputted into the receiving unit (RX) 202d.

The receiving unit 202a analog-multiplies, in a mixer, the inputted signal by the signal inputted from a carrier regeneration circuit through a low-noise amplifier, and outputs an IF signal. The IF signal output from the receiving unit 202a is filtered in the filter 206a, converted into a digital signal in the AD converter 207a, and then output to the distributor 208a. The distributor 208a distributes the inputted signal to the despreading unit 209a and the clock synchronization unit 210a.

The despreading unit 209a performs the spectrum-despreading on the inputted one signal (received information signal+spread-spectrum clock signal), extracts the original clock signal, and outputs the extracted clock signal to the clock synchronization unit 210a. The clock synchronization unit 210a synchronizes the information signal with the clock signal inputted from the despreading unit 209a with respect to the inputted other signal.

The information signal synchronized with the clock in the clock synchronization unit 210a is subjected to adaptive matching processing in the AMF 214a, and output to a combiner 215. The AMF 214a is in the public domain, and the AMF 214a estimates a transmission channel response and performs the processing for convoluting the inverse characteristics of the transmission channel response into the input signal, as the adaptive matching processing.

With respect to other branches, that is, the signals inputted into the receiving unit 202b to 202d, the same processing is performed respectively, and the outputs of the AMFs 214b to 214d are inputted into the combiner 215.

The combiner 215 diversity-combines the four-wave signals inputted from the respective branches. The combiner 215 selects a branch with the highest reception level from among the four diversity branches (selective combining), as diversity combining. Alternatively, the combiner 215 makes the signals of the respective branches in phase, combines the signals with weighting, and outputs the resultant signals (maximum ratio combining, or equalizing weighting values).

The signal output from the combiner 215 is supplied to a decision feedback equalizer (DFE) 216. The DFE 216 has a configuration which has become publicly known, eliminates the intersymbol interference (delay wave component) from the output signal of the combiner 215 using a decision value of a past symbol, and outputs the resultant signal to a demodulation unit 211. The DFE 216 is composed of an equalization filter unit, a decision unit for deciding data based on the output from the equalization filter unit, an equalization error estimation unit for calculating an error between the output of the equalization filter unit and a reference signal, a tap gain control unit for controlling a tap gain of the equalization filter unit so as to minimize the error, and the like, for example.

The demodulation unit 211 demodulates the inputted signal and outputs the resultant signal to a decoding unit 212. The decoding unit 212 LDPC-decodes the demodulated signal and outputs the resultant signal as an information signal to an information processing unit and the like which are not illustrated.

The wireless receiving device 200B illustrated in FIG. 9 may be implemented in a mobile terminal. In this case, if the receiving antennas 201a and 201b for reception are equal to or more than $\lambda/2$ ($\lambda$ represents a wavelength) away, the correlation between the branches becomes lower; therefore, a sufficient diversity effect can be obtained.

According to the present exemplary embodiment, it is possible to improve receiving characteristics against the fading fluctuation by means of the diversity techniques, the adaptive equalization techniques, and the like.

The present invention is not limited to the above-described embodiments. Any design variations without departing from the scope of the present invention are included in the present invention.

This application is based upon and claims the benefit of priority from Japanese Patent Application No. 2014-038949, filed on Feb. 28, 2014, the disclosure of which is incorporated herein in its entirety by reference.

INDUSTRIAL APPLICABILITY

The present invention is preferably applied to the communication using propagation channels where the multipath fading arises. In addition, as examples using the present invention, the present invention is applicable to tropospheric scatter propagation communications, land mobile communications, and the like.

REFERENCE SIGNS LIST

1 Wireless transmission device
2 Wireless receiving device

11 Clock generation unit
12 Spreading unit
13 Adder
14 Transmission unit
21 Receiving unit
22 Distributor
23 Despreading unit
24 Clock synchronization unit
100, 100B, 100C Wireless transmission device
101 Encoding unit
102 Modulation unit
103 Clock generation unit
104, 104$_I$, 104$_Q$ Adder
105 Spreading unit
106, 106$_I$, 106$_Q$ DA converter
107, 107$_I$, 107$_Q$ Filter
108, 108a, 108b Transmission unit
109, 109$_I$, 109$_Q$ Mixer
110 Local oscillator
111 Frequency converter unit
112, 112a, 112b Power amplifier
113, 113a, 113b Transmitting antenna
114 Phase shifter
115 Adder
200, 200B Wireless receiving device
201 Receiving antenna
202, 202a, 202b, 202c, 202d Receiving unit
203 Low-noise amplifier
204 Mixer
205 Carrier regeneration circuit
206, 206a, 206b, 206c, 206d Filter
207, 207a, 207b, 207c, 207d AD converter
208, 208a, 208b, 208c, 208d Distributor
209, 209a, 209b, 209c, 209d Despreading unit
210, 210a, 210b, 210c, 210d Clock synchronization unit
211 Demodulation unit
212 Decoding unit
213a, 213b Frequency distributor
214a, 214b, 214c, 214d Adaptive matched filter
215 Combiner
216 DFE
1051 PN code generator
1052 Multiplier
2090 Multiplier
2091 Replica PN code generator
2092 Accumulator
2093 Adder
2094 D type register
2095 Decision circuit
2096 Timing generation circuit
2097 Tapped delay line
2098 Multiplier
2099 Adder

What is claimed is:

1. A wireless transmission device, comprising:
clock generation unit for generating a clock signal;
spreading unit for multiplying the clock signal by a spreading code and generating a spread-spectrum clock signal whose spectrum being made to spread;
an adder configured to superimpose an information signal on the spread-spectrum clock signal; and
transmitting unit for performing frequency conversion on an output signal from the adder and transmitting a radio signal by the wireless transmission device.

2. The wireless transmission device according to claim 1, wherein the adder superimposes an information signal modulated by a modulation unit on the spread-spectrum clock signal.

3. The wireless transmission device according to claim 2, wherein the clock signal is supplied to the modulation unit as a timing clock signal for defining a symbol rate.

4. A wireless receiving device, comprising:
receiving unit for receiving a radio signal including a signal obtained by superimposing an information signal on a spread-spectrum clock signal, performing frequency conversion on the radio signal, and outputting frequency-converted signal as a received signal;
a distributor configured to divide the received signal having been output into two lines;
despreading unit for performing spectrum despreading on one of divided received signals by multiplying a spreading code and extracting a clock signal; and
clock synchronization unit for performing clock synchronization on other one of the divided received signals using the clock signal having been extracted.

5. The wireless receiving device according to claim 4, wherein the information signal synchronized with the clock signal is demodulated by a demodulation unit.

6. The wireless receiving device according to claim 5, wherein the demodulation unit uses the clock signal having been extracted as a timing clock signal for defining a symbol rate.

7. A wireless communication system, comprising:
the wireless transmission device according to claim 1, the wireless transmission device configured to transmit the radio signal; and
a wireless receiving device, including
receiving unit for receiving the radio signal including a signal obtained by superimposing the information signal on the spread-spectrum clock signal, performing frequency conversion on the radio signal, and outputting frequency-converted signal as a received signal;
a distributor configured to divide the received signal having been output into two lines;
despreading unit for performing spectrum despreading on one of divided received signals by multiplying a spreading code and extracting a clock signal; and
clock synchronization unit for performing clock synchronization on other one of the divided received signals using the clock signal having been extracted.

8. A wireless communication method, comprising:
on a transmission side,
multiplying a clock signal by a spreading code and generating a spread-spectrum clock signal whose spectrum being made to spread;
performing frequency conversion on a signal obtained by superimposing an information signal on the spread-spectrum clock signal and transmitting a radio signal by wireless; and,
on a receiving side,
receiving the radio signal, performing frequency conversion on the radio signal, and dividing a frequency-converted radio signal into two lines;
extracting a clock signal by performing spectrum despreading on one of divided radio signals by multiplying a spreading code; and
performing clock synchronization on other one of the divided radio signals using the clock signal having been extracted.

9. The wireless communication method according to claim 8, wherein
   on the transmission side, a modulation is performed on an information signal, and the information signal having been modulated is superimposed on the spread-spectrum clock signal; and,
   on the receiving side, a demodulation is performed on an information signal synchronized with the clock signal based on a clock signal having been extracted.

10. The wireless communication method according to claim 9, wherein the modulation and the demodulation are performed by from the transmission side and the receiving side as a timing clock signal for defining a symbol rate.

11. The wireless communication system according to claim 7, wherein the adder superimposes an information signal modulated by a modulation unit on the spread-spectrum clock signal.

12. The wireless communication system according to claim 11, wherein the clock signal is supplied to the modulation unit as a timing clock signal for defining a symbol rate.

13. The wireless communication system according to claim 7, wherein the information signal synchronized with the clock signal is demodulated by a demodulation unit.

14. The wireless communication system according to claim 13, wherein the demodulation unit uses the clock signal having been extracted as a timing clock signal for defining a symbol rate.

* * * * *